(12) United States Patent
Tseng et al.

(10) Patent No.: US 11,420,473 B2
(45) Date of Patent: Aug. 23, 2022

(54) BICYCLE AND TIRE STRUCTURE

(71) Applicant: GIANT MANUFACTURING CO., LTD., Taichung (TW)

(72) Inventors: Wei-Han Tseng, Hsinchu (TW); Che-Wei Hsu, New Taipei (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 326 days.

(21) Appl. No.: 16/244,087

(22) Filed: Jan. 9, 2019

(65) Prior Publication Data
US 2019/0217664 A1 Jul. 18, 2019

(30) Foreign Application Priority Data

Jan. 12, 2018 (TW) .................................. 107200621

(51) Int. Cl.
| | | |
|---|---|---|
| *B60C 15/02* | (2006.01) | |
| *B60C 5/20* | (2006.01) | |
| *B60C 29/06* | (2006.01) | |
| *B60C 5/16* | (2006.01) | |
| *B60C 29/04* | (2006.01) | |
| *B60C 29/00* | (2006.01) | |
| *B60C 29/02* | (2006.01) | |

(Continued)

(52) U.S. Cl.
CPC .................. *B60C 5/16* (2013.01); *B60C 3/02* (2013.01); *B60C 5/12* (2013.01); *B60C 15/024* (2013.01); *B60C 29/00* (2013.01); *B60C 29/005* (2013.01); *B60C 29/02* (2013.01); *B60C 29/04* (2013.01); *B60C 29/06* (2013.01); *B60C 2200/12* (2013.01)

(58) Field of Classification Search
CPC .... B60C 5/20; B60C 5/22; B60C 3/02; B60C 17/04; B60C 17/041; B60C 17/043; B60C 17/044; B60C 29/06
See application file for complete search history.

(56) References Cited

U.S. PATENT DOCUMENTS 1,079,397 A * 11/1913 Clark .................... B60C 15/028
152/401
1,249,014 A * 12/1917 Brenner .................. B60C 17/01
152/340.1

(Continued)

FOREIGN PATENT DOCUMENTS

| CN | 2489989 Y | 5/2002 |
|---|---|---|
| CN | 201030773 Y | 3/2008 |

(Continued)

*Primary Examiner* — Justin R Fischer
(74) *Attorney, Agent, or Firm* — CKC & Partners Co., LLC

(57) ABSTRACT

A tire structure disposed at a rim is provided. The tire structure includes a tire body, a flexible sealing member and a nozzle. The tire body is ring-shaped and includes a groove and two beads. The flexible sealing member is connected to the tire body to form an inflating space with the groove, and the flexible sealing member includes a through hole. The nozzle is disposed at the flexible sealing member. The nozzle includes a base and a valve stem. The base includes a screw hole and is disposed at a far side of the flexible sealing member. The screw hole corresponds to the through hole. The valve stem includes a fastening end and an inflating channel. The fastening end is configured to insert into the screw hole, and the inflating channel is configured to allow the gas to pass therethrough.

7 Claims, 5 Drawing Sheets

(51) Int. Cl.
*B60C 15/024* (2006.01)
*B60C 3/02* (2006.01)
*B60C 5/12* (2006.01)

(56) References Cited

U.S. PATENT DOCUMENTS

| | | | | |
|---|---|---|---|---|
| 1,295,604 | A | * | 2/1919 | Roberts .................... B60C 5/16 152/514 |
| 1,637,599 | A | | 8/1927 | Ballew |
| 2,495,955 | A | * | 1/1950 | Bourdon ................. B60C 29/04 152/429 |
| 3,848,652 | A | * | 11/1974 | Hughes .................... B60C 5/16 152/427 |
| 4,016,918 | A | * | 4/1977 | Thacker ................. B60C 29/00 152/427 |
| 4,793,374 | A | | 12/1988 | Earley |
| 6,318,428 | B1 | | 11/2001 | Lo |
| 8,151,845 | B2 | * | 4/2012 | Merino-Lopez ...... B60C 19/002 152/331.1 |
| 2008/0264539 | A1 | | 10/2008 | Merino-Lopez et al. |
| 2011/0204706 | A1 | | 8/2011 | Eder et al. |
| 2016/0207355 | A1 | | 7/2016 | Geddis |
| 2017/0203621 | A1 | | 7/2017 | Hsieh |

FOREIGN PATENT DOCUMENTS

| | | | |
|---|---|---|---|
| CN | 203126420 | U | 8/2013 |
| CN | 205601525 | U | 9/2016 |
| DE | 3114383 | * | 10/1982 |
| DE | 10255167 | * | 1/2004 |
| EP | 1197353 | B1 | 7/2005 |
| GB | 1504127 | * | 3/1978 |
| GB | 2101273 | A | 1/1983 |
| JP | S61241208 | A | 10/1986 |
| JP | 2011173589 | A | 9/2011 |
| WO | 02062595 | A1 | 8/2002 |
| WO | 2016115281 | A1 | 7/2016 |

\* cited by examiner

BICYCLE AND TIRE STRUCTURE

RELATED APPLICATIONS

This application claims priority to Taiwan Application Serial Number 107200621, filed Jan. 12, 2018, which is herein incorporated by reference.

BACKGROUND

Technical Field

The present disclosure relates to a bicycle and a tire structure. More particularly, the present disclosure relates to a tubeless tire structure and a bicycle having the same.

Description of Related Art

A conventional tire structure includes a cover, an inner tube and a nozzle, and the inner tube is disposed within the cover. A gas enters the inner tube via the nozzle such that the inner tube is filled up with the gas and has a specific pressure. However, since the cover and the inner tube are independently manufactured, the cost is high. In addition, the broken of the inner tube leads to a sudden blowout, which puts riders at high risk.

For solving the problems, a tubeless tire structure has been developed. The tubeless tire structure includes a cover and a nozzle, and the cover directly disposed at the rim to form an inflating space between the cover and the rim. The inflating space can be filled up with the gas such that the tire has specific pressure for supporting the bicycles. However, when pumping the tire, the gas needs to be flowed into the inflating space rapidly at the beginning in order to prevent leakage of the gas from the gap between the tire bead and the rim. Hence, the airtightness between the tire bead and the rim is very important.

In order to further improve the airtightness between the tire bead and the rim, a tubeless tire with a lining was developed. A through hole needs to be formed on the lining to communicate with the screw hole of a nozzle's base such that a channel can be formed after the nozzle's valve stem inserted into the nozzle's base, and the gas or the anti-puncture liquid is allowed to enter the inflating space via the channel. However, in the post-process, boring through the lining having a curtain is hard since the burrs create easily after drilling. In addition, the usage of the anti-puncture liquid having fibers will block the channel of the nozzle; as a result, the tire cannot be inflated or deflated, and the tire pressure cannot be measured.

Based on the above-mentioned problems, how to effectively improve the tire structure to prevent the block of the nozzle's channel becomes a pursuit target for the practitioners.

SUMMARY

A tire structure disposed at a rim is provided. The tire structure includes a tire body, a flexible sealing member and a nozzle. The tire body is ring-shaped and includes a groove and two beads. The groove has a groove opening facing toward the rim. The two beads are disposed at two opposite sides of the groove opening, respectively, and are configured to engage with the rim. The flexible sealing member is connected to the tire body to form an inflating space with the groove, and the flexible sealing member includes a through hole. The nozzle is disposed at the flexible sealing member. The nozzle is configured to allow a gas to enter the inflating space, and the nozzle includes a base and a valve stem. The base includes a screw hole and is disposed at a far side of the flexible sealing member. The far side of the flexible sealing member faces away from the tire body. The screw hole corresponds to the through hole. The valve stem includes a fastening end and an inflating channel. The fastening end is configured to insert into the screw hole, and the inflating channel is configured to allow the gas to pass therethrough. The fastening end of the valve stem protrudes from the through hole after inserting into the screw hole such that the inflating channel is communicated with the inflating space.

A bicycle is provided. The bicycle includes two wheels, and at least one of the two wheels includes a rim and a tire structure disposed at the rim. The tire structure includes a tire body, a flexible sealing member and a nozzle. The tire body is ring-shaped and includes a groove and two beads. The groove has a groove opening facing toward the rim. The two beads are disposed at two opposite sides of the groove opening, respectively, and are configured to engage with the rim. The flexible sealing member is connected to the tire body to form an inflating space with the groove, and the flexible sealing member includes a through hole. The nozzle is disposed at the flexible sealing member. The nozzle is configured to allow a gas to enter the inflating space, and the nozzle includes a base and a valve stem. The base includes a clearance hole and is disposed at a far side of the flexible sealing member. The far side of the flexible sealing member faces away from the tire body. The clearance hole corresponds to the through hole. The valve stem includes a fastening end and an inflating channel. The fastening end is configured to insert into the clearance hole, and the inflating channel is configured to allow the gas to pass therethrough. The fastening end of the valve stem protrudes from the through hole after inserting into the clearance hole such that the inflating channel is communicated with the inflating space.

A tire structure disposed at a rim is provided. The tire structure includes a tire body, a flexible sealing member and a nozzle. The tire body is ring-shaped and includes a groove and two beads. The groove has a groove opening facing toward the rim. The two beads are disposed at two opposite sides of the groove opening, respectively, and are configured to engage with the rim. The flexible sealing member is connected to the tire body to form an inflating space with the groove. The flexible sealing member includes a through hole, an inner surface facing toward the tire body, and an outer surface facing away the tire body. The nozzle is disposed at the flexible sealing member. The nozzle is configured to allow a gas to enter the inflating space, and the nozzle includes a base and a valve stem. The base includes a screw hole and is disposed at the outer surface of the flexible sealing member. The screw hole corresponds to the through hole. The valve stem includes a fastening end and an inflating channel. The fastening end is configured to insert into the screw hole, and the inflating channel is configured to allow the gas to pass therethrough. The fastening end of the valve stem protrudes from the inner surface after inserting into the screw hole and passing through the through hole such that the inflating channel is communicated with the inflating space.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as be "disposed on/at", "connected to" or "coupled to" another element, it can be directly disposed on/at, connected or coupled to the other element, or it can be indirectly disposed on/at, connected or coupled to the other element, that is, intervening elements may be present. In contrast, when an element is referred to as be "directly disposed on/at," "directly connected to" or "directly coupled to" another element, there are no intervening elements present.

In addition, the terms first, second, third, etc. is used herein to describe various elements or components, these elements or components should not be limited by these terms. Consequently, a first element or component discussed below could be termed a second element or component.

Figure 1:
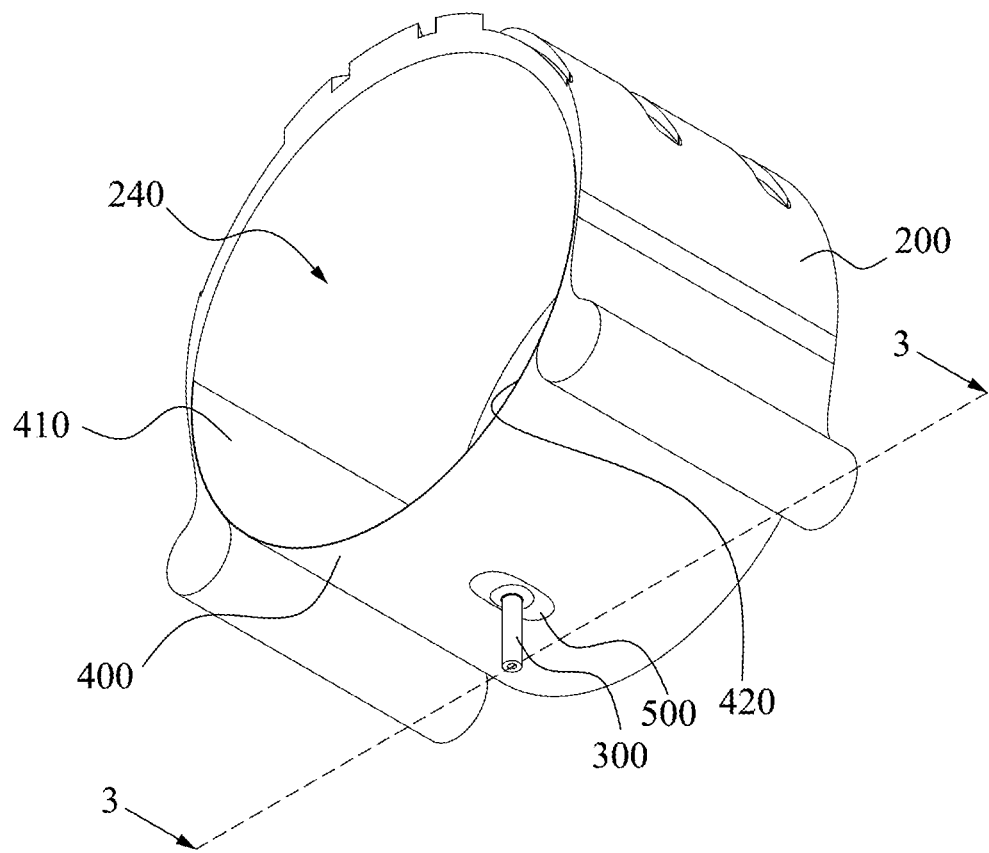
FIG. 1 shows a schematic view of a tire structure according to one embodiment of the present disclosure.
Figure 2:
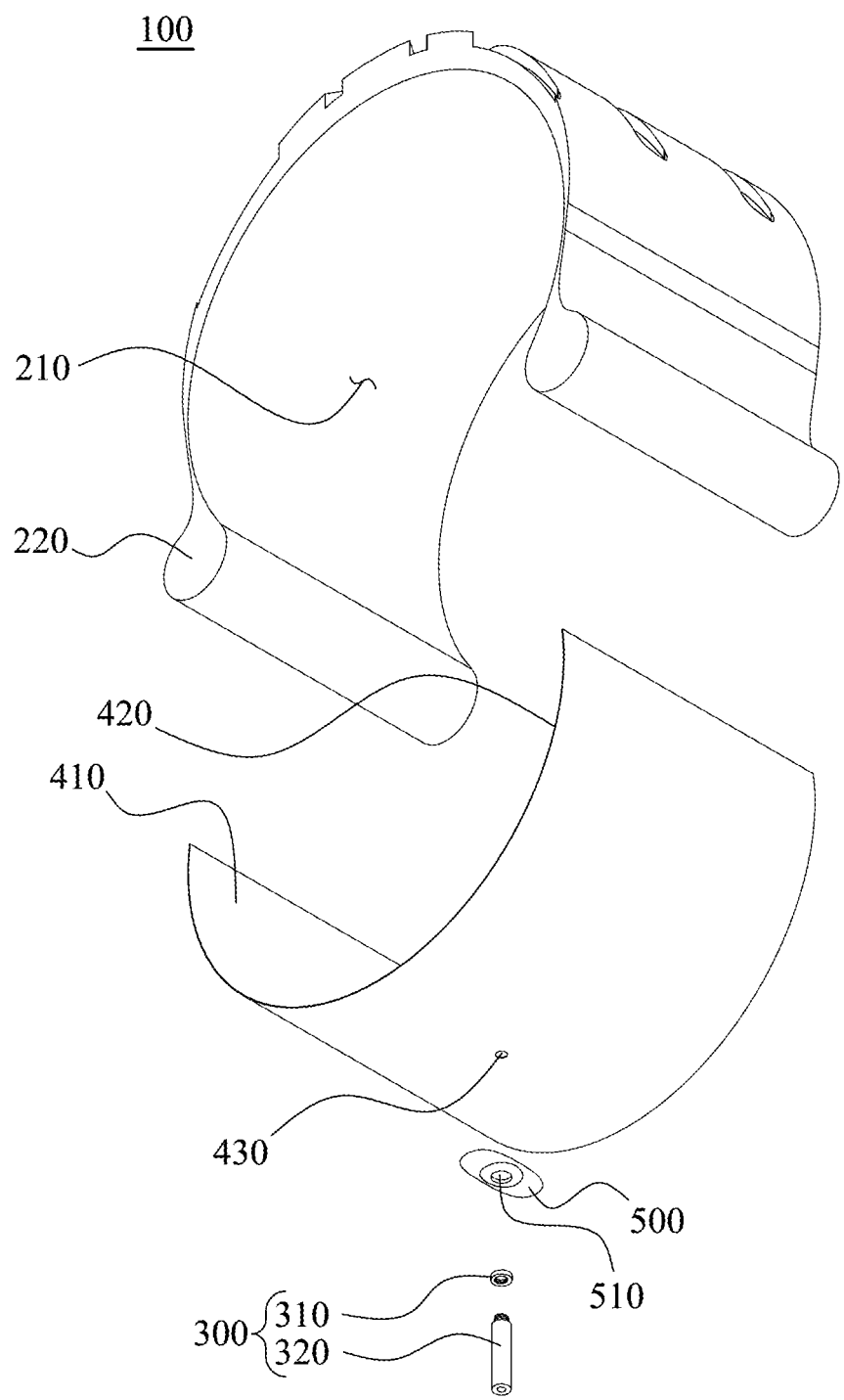
FIG. 2 shows an exploded view of the tire structure of FIG. 1.
Figure 3:
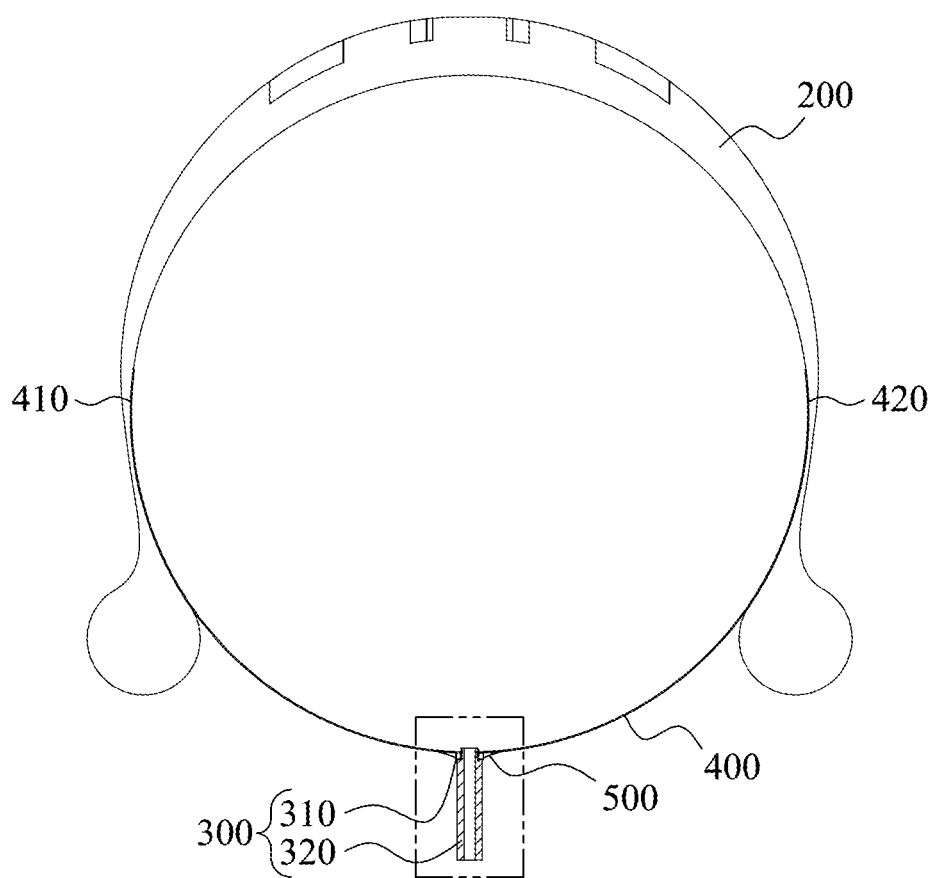
FIG. 3 shows a cross-sectional view of the tire structure of FIG. 1 taken along line 3-3.
Figure 4:
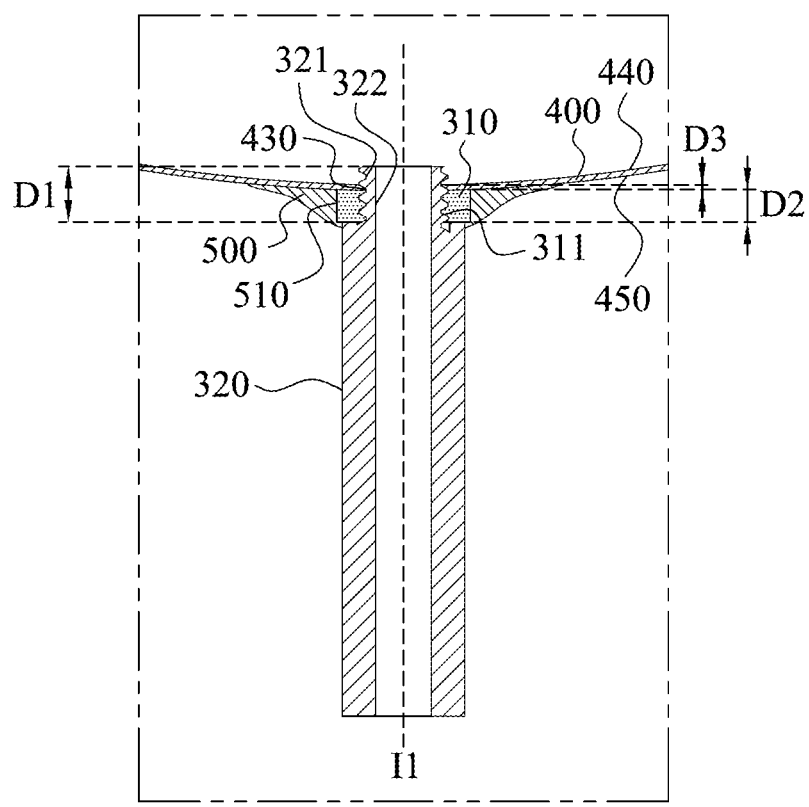
FIG. 4 shows an enlarged view of the tire structure of FIG. 3.

FIG. 1 shows a schematic view of a tire structure 100 according to one embodiment of the present disclosure. FIG. 2 shows an exploded view of the tire structure 100 of FIG. 1. FIG. 3 shows a cross-sectional view of the tire structure 100 of FIG. 1 taken along line 3-3. FIG. 4 shows an enlarged view of the tire structure 100 of FIG. 3. The tire structure 100 disposed at a rim (not shown in FIGS. 1-4) includes a tire body 200, a flexible sealing member 400 and a nozzle 300.

The tire body 200 is ring-shaped and includes a groove 210 and two beads 220. The groove 210 has a groove opening (not labeled) facing toward the rim. The two beads 220 are disposed at two opposite sides of the groove opening, respectively, and are configured to engage with the rim. The flexible sealing member 400 is connected to the tire body 200 to form an inflating space 240 with the groove 210, and the flexible sealing member 400 includes a through hole 430. The nozzle 300 is disposed at the flexible sealing member 400. The nozzle 300 is configured to allow a gas to enter the inflating space 240, and the nozzle 300 includes a base 310 and a valve stem 320. The base 310 includes a screw hole 311 and is disposed at a far side of the flexible sealing member 400. The far side of the flexible sealing member 400 faces away from the tire body 200. The screw hole 311 corresponds to the through hole 430.

The valve stem 320 includes a fastening end 321 and an inflating channel 322. The fastening end 321 is configured to insert into the screw hole 311, and the inflating channel 322 is configured to allow the gas to pass therethrough. The fastening end 321 of the valve stem 320 protrudes from the through hole 430 after inserting into the screw hole 311 such that the inflating channel 322 is communicated with the inflating space 240.

Therefore, since the fastening end 321 of the valve stem 320 protrudes from the through hole 430, block of the inflating channel 322 owing to the badly processed flexible sealing member 400 can be prevented. The problems of inflating or deflating difficulty and block of the inflating channel 322 can be solved. The details of the tire structure 100 will be described in the following paragraphs.

The tire body 200, also named as "cover" in the tire field, is ring-shaped and surrounds the rim. The tire body 200 has an Ω-shaped cross-section and includes the groove 210 and the two beads 220. The shape, material, structure and the manufacture process of the tire body 200 are well known in the tire field, and will not be described in detail.

The flexible sealing member 400 has a closed annular belt structure. The flexible sealing member 400 has two opposite sides 410, 420. The two sides 410, 420 are fixed at an inner wall of the tire body 200, which is near the groove opening, to allow the flexible sealing member 400 to be attached to the tire body 200. The flexible sealing member 400 has elasticity and can be deformed. The flexible sealing member 400 further includes an inner surface 440 facing toward the tire body 200 and an outer surface 450 facing away the tire body 200. The base 310 is disposed at the outer surface 450 of the flexible sealing member 400. Please be noted that the tire structure 100 shown in FIGS. 1 to 3 is inflated, and a cross-section thereof is ring-shaped. The flexible sealing member 400 is sank into the groove 210 of the tire body 200 if the tire structure 100 is not inflated, and will not be limited by the drawings.

In the embodiment of FIG. 1 to FIG. 4, the nozzle 300 has an axial direction 11. The fastening end 321 can include a thread segment (not labeled). The thread segment has a first length D1 in the axial direction 11. The screw hole 311 has a second length D2 in the axial direction 11, and the first length D1 is larger than the second length D2. Therefore, the fastening end 321 of the valve stem 320 can protrude from the through hole 430 after inserting into the screw hole 311.

Precisely, as shown in FIG. 4, the screw hole 311 through the base 310 can have an inner thread. The inner thread corresponds to an outer thread of the thread segment, and the fastening end 321 can be screwed into the screw hole 311. Because the first length D1 of the tread segment is larger than the second length D2 of the screw hole 311, when the fastening end 321 is inserted into the screw hole 311 and a shoulder (not labeled) of the valve stem 320 is pushed against the base 310, not only can the fastening end 321 protrude from the through hole 430, but the fastening end 321 can also be completely engaged with the screw hole 311. The manufacture is easy since the first length D1 of the thread segment can be increased by extending the length of thread cutting when the valve stem 320 is manufactured by the lathe machine. In other embodiment, the fastening end can further include a segment without thread. The key feature is that the fastening end protrudes from the through hole after inserting into the base, and will not be limited thereto.

To be more specific, the flexible sealing member 400 has a third length D3 in the axial direction 11, which is defined as the thickness of the flexible sealing member 400. The first length D1 is larger than a sum of the second length D2 and the third length D3, that is, D1>(D2+D3). Therefore, the fastening end 321 of the valve stem 320 can protrude from the inner surface 440 after inserting into the screw hole 311 and passing through the through hole 430.

Additionally, the tire structure 100 can further includes an adhesive member 500 disposed at the far side of the flexible sealing member 400, and the adhesive member 500 surrounds and covers a part of the base 310. The adhesive member 500 can have an aperture 510 configured to receive the base 310. Through the assistance of the adhesive member 500, the base 310 can be firmly disposed at the flexible sealing member 400.

In other embodiment, the screw hole can be instead by a clearance hole. The fastening end can be connected to the clearance hole by other methods such as engagement or welding, and will not be limited thereto.

Figure 5:
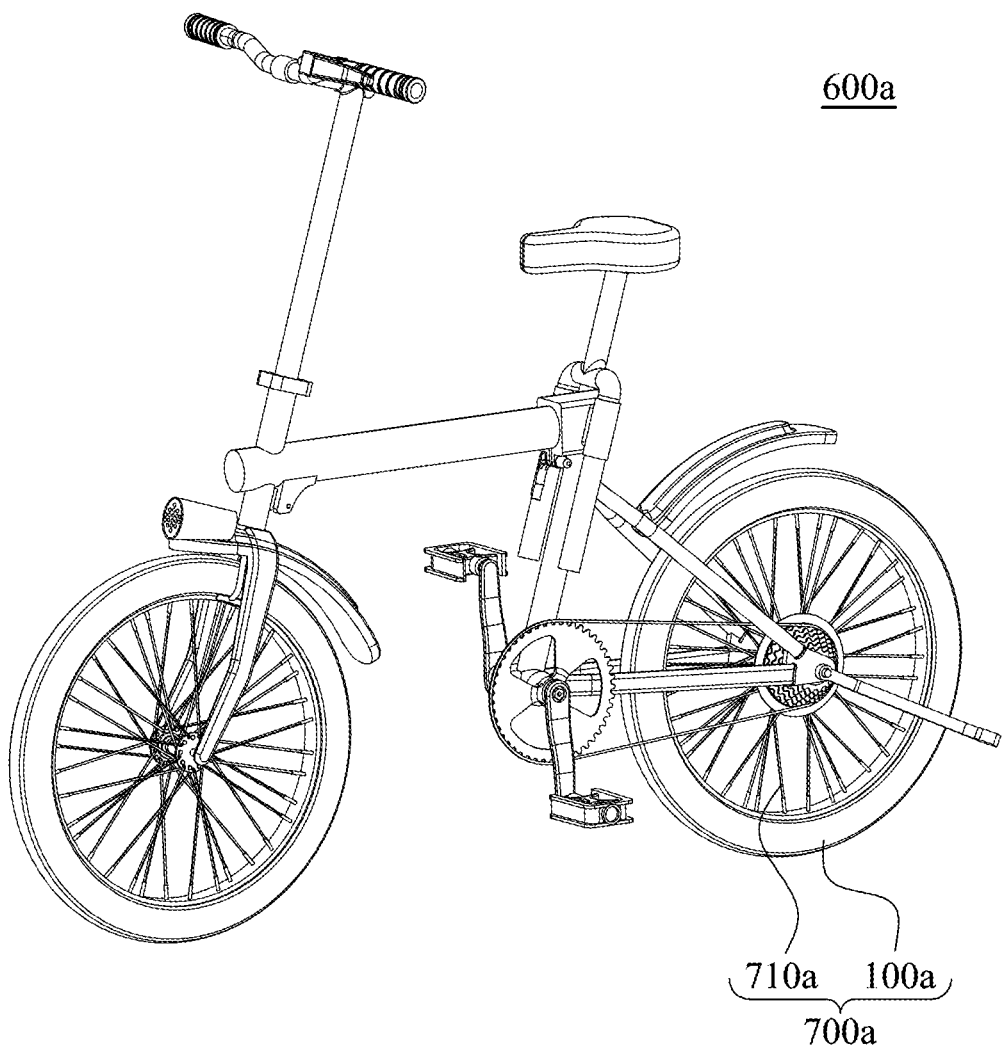
FIG. 5 shows a schematic view of a bicycle according to another embodiment of the present disclosure.

FIG. 5 shows a schematic view of a bicycle 600a according to another embodiment of the present disclosure. The bicycle 600a includes two wheels 700a, and at least one of the two wheels 700a includes a rim 710a and a tire structure 100a. The tire structure 100a is disposed at the rim 710a. The tire structure 100a is similar to the tire structure 100 as described in FIGS. 1 to 4 and will not be described again.

Based on the above-mentioned embodiments, it is clear that through the structure configuration that the fastening end of the valve stem is exposed from the through hole after fastening into the base, block of the inflating channel owing to the badly processed flexible sealing member can be prevented. In other words, when boring a hole or a crack on the flexible sealing member in the post process, the burr or excess material creates. Because the fastening end will protrude from the through hole after inserting into the screw hole, the burr or the excess material will be pushed into the inflating space such that block of the inflating channel can be prevented. Accordingly, the gas or the anti-punching liquid can be inflated smoothly.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A tire structure disposed at a rim, the tire structure comprising:
   a tire body being ring-shaped and comprising:
      a groove having a groove opening facing toward the rim; and
      two beads disposed at two opposite sides of the groove opening, respectively, the two beads configured to engage with the rim, each of the beads comprising a bead seat portion resting on the rim;
   a flexible sealing member having two opposite sides respectively fixed at two edges of an inner wall of the tire body to form an inflating space with the groove, wherein the two edges are near the groove opening, each of the two opposite sides of the flexible sealing member does not connect to each of the bead seat portions, and the flexible sealing member comprises a through hole;
   a nozzle disposed at the flexible sealing member, the nozzle configured to allow a gas to enter the inflating space, the nozzle comprising:
      a base comprising a screw hole, the base disposed at a far side of the flexible sealing member, wherein the far side of the flexible sealing member faces away from the tire body, and the screw hole corresponds to the through hole; and
      a valve stem, comprising:
         a fastening end configured to insert into the screw hole; and
         an inflating channel configured to allow the gas to pass therethrough; and
   an adhesive member disposed at the far side of the flexible sealing member, the adhesive member surrounding and covering a part of the base;
   wherein the base is attached to the flexible sealing member first, then the fastening end of the valve stem is inserted into the screw hole and the through hole to push a burr or an excess material into the inflating space.

2. The tire structure of claim 1, wherein the nozzle has an axial direction, the fastening end comprises a thread segment, the thread segment has a first length in the axial direction, the screw hole has a second length in the axial direction, and the first length is larger than the second length.

3. A bicycle, comprising:
   two wheels, at least one of the two wheels comprising:
      a rim; and
      a tire structure disposed at the rim and comprising:
         a tire body being ring-shaped and comprising:
            a groove having a groove opening facing toward the rim; and
            two beads disposed at two opposite sides of the groove opening, respectively, the two beads configured to engage with the rim, each of the beads comprising a bead seat portion resting on the rim;
         a flexible sealing member having two opposite sides respectively fixed at two edges of an inner wall of the tire body to form an inflating space with the groove, wherein the two edges are near the groove opening, each of the two opposite sides of the flexible sealing member does not connect to each of the bead seat portions, and the flexible sealing member comprises a through hole;
         a nozzle disposed at the flexible sealing member, the nozzle configured to allow a gas to enter the inflating space, the nozzle comprising:
            a base comprising a screw hole, the base disposed at a far side of the flexible sealing member, wherein the far side of the flexible sealing member faces away from the tire body, and the screw hole corresponds to the through hole; and
            a valve stem, comprising:
               a fastening end configured to insert into the screw hole; and
               an inflating channel configured to allow the gas to flow therethrough; and
         an adhesive member disposed at the far side of the flexible sealing member, the adhesive member surrounding and covering a part of the base;
   wherein the base is attached to the flexible sealing member first, then the fastening end of the valve stem is inserted into the screw hole and the through hole to push a burr or an excess material into the inflating space.

4. The bicycle of claim 3, wherein the nozzle has an axial direction, the fastening end comprises a thread segment, the thread segment has a first length in the axial direction, the screw hole has a second length in the axial direction, and the first length is larger than the second length.

5. A bicycle, comprising:
   two wheels, at least one of the two wheels comprising:
      a rim; and
      a tire structure disposed at the rim and comprising:
         a tire body being ring-shaped and comprising:
            a groove having a groove opening facing toward the rim; and two beads disposed at two opposite sides of the groove opening, respectively, the two beads configured to engage with the rim, each of the beads comprising a bead seat portion resting on the rim;

a flexible sealing member having two opposite sides respectively fixed at two edges of an inner wall of the tire body to form an inflating space with the groove, wherein the two edges are near the groove opening, each of the two opposite sides of the flexible sealing member does not connect to each of the bead seat portions, and the flexible sealing member comprises a through hole;

a nozzle disposed at the flexible sealing member, the nozzle configured to allow a gas to enter the inflating space, the nozzle comprising:
 a base comprising a clearance hole, the base disposed at a far side of the flexible sealing member, wherein the far side of the flexible sealing member faces away from the tire body, and the clearance hole corresponds to the through hole; and
 a valve stem, comprising:
  a fastening end configured to insert into the clearance hole; and
  an inflating channel configured to allow the gas to flow therethrough; and
 an adhesive member disposed at the far side of the flexible sealing member, the adhesive member surrounding and covering a part of the base;
wherein the base is attached to the flexible sealing member first, then the fastening end of the valve stem is inserted into the clearance hole and the through hole to push a burr or an excess material into the inflating space.

6. A tire structure disposed at a rim, the tire structure comprising:
 a tire body being ring-shaped and comprising:
  a groove having a groove opening facing toward the rim; and
  two beads disposed at two opposite sides of the groove opening, respectively, the two beads configured to engage with the rim, each of the beads comprising a bead seat portion resting on the rim;
 a flexible sealing member having two opposite sides respectively fixed at two edges of an inner wall of the tire body to form an inflating space with the groove, wherein the two edges are near the groove opening, each of the two opposite sides of the flexible sealing member does not connect to each of the bead seat portions, and the flexible sealing member comprises a through hole, an inner surface facing toward the tire body, and an outer surface facing away the tire body;
 a nozzle disposed at the flexible sealing member, the nozzle configured to allow a gas to enter the inflating space, the nozzle comprising:
  a base comprising a screw hole, the base disposed at the outer surface of the flexible sealing member, wherein the screw hole corresponds to the through hole;
  a valve stem, comprising:
   a fastening end configured to insert into the screw hole;
   an inflating channel configured to allow the gas to pass therethrough; and
  an adhesive member disposed at the outer surface of the flexible sealing member, the adhesive member surrounding and covering a part of the base;
 wherein the base is attached to the flexible sealing member first, then the fastening end of the valve stem is inserted into the screw hole and the through hole to push a burr or an excess material into the inflating space.

7. The tire structure of claim 6, wherein the nozzle has an axial direction, the fastening end comprises a thread segment, the thread segment has a first length in the axial direction, the screw hole has a second length in the axial direction, the flexible sealing member has a third length in the axial direction, and the first length is larger than a sum of the second length and the third length.

* * * * *